United States Patent

Doi

(10) Patent No.: US 10,712,294 B2
(45) Date of Patent: Jul. 14, 2020

(54) X-RAY DIFFRACTION ANALYSIS METHOD AND X-RAY DIFFRACTION ANALYSIS APPARATUS

(71) Applicant: FUJITSU LIMITED, Kawasaki-shi, Kanagawa (JP)

(72) Inventor: Shuuichi Doi, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 15/996,766

(22) Filed: Jun. 4, 2018

(65) Prior Publication Data

US 2018/0356354 A1 Dec. 13, 2018

(30) Foreign Application Priority Data

Jun. 8, 2017 (JP) ................. 2017-113708

(51) Int. Cl.
*G01N 23/207* (2018.01)
*G01N 23/20025* (2018.01)
*G01N 23/04* (2018.01)
*G01N 23/201* (2018.01)

(52) U.S. Cl.
CPC ........... *G01N 23/207* (2013.01); *G01N 23/04* (2013.01); *G01N 23/201* (2013.01); *G01N 23/20025* (2013.01); *G01N 2223/0566* (2013.01); *G01N 2223/605* (2013.01)

(58) Field of Classification Search
CPC ................ G01N 23/20025; G01N 23/207
See application file for complete search history.

(56) References Cited

U.S. PATENT DOCUMENTS

| 2013/0077754 | A1 | 3/2013 | Sasaki et al. |
| 2017/0343492 | A1* | 11/2017 | Ikeda ............ G01N 23/207 |

FOREIGN PATENT DOCUMENTS

| JP | 2004-069338 | 3/2004 |
| JP | 2004-347502 | 12/2004 |
| JP | 2006-50642 | * 9/2006 |
| JP | 2013-068555 | 4/2013 |

OTHER PUBLICATIONS

JP 2006-250642 Machine Translation (Year: 2005).*

* cited by examiner

*Primary Examiner* — Yara B Green
(74) *Attorney, Agent, or Firm* — Fujitsu Patent Center

(57) ABSTRACT

An X-ray diffraction analysis method includes, placing a sample on a sample stage and acquiring a two-dimensional X-ray diffraction image from the sample using a two-dimensional detection circuit by irradiating the sample with an X-ray in a state where an X-ray irradiation angle is fixed, specifying a collection of diffraction spots having a predetermined range of diffraction angles from the X-ray diffraction image as a diffraction spot group, counting the number of diffraction spots having predetermined intensity or more in the diffraction spot group, grouping the diffraction spot group based on the number of diffraction spots, and identifying a crystal phase contained in the sample based on a diffraction angle of the grouped diffraction spot group.

8 Claims, 8 Drawing Sheets

X-RAY DIFFRACTION ANALYSIS METHOD AND X-RAY DIFFRACTION ANALYSIS APPARATUS

CROSS-REFERENCE TO RELATED APPLICATION

This application is based upon and claims the benefit of priority of the prior Japanese Patent Application No. 2017-113708, filed on Jun. 8, 2017, the entire contents of which are incorporated herein by reference.

FIELD

The embodiments discussed herein are related to an X-ray diffraction analysis method and an X-ray diffraction analysis apparatus.

BACKGROUND

An X-ray diffraction analysis method is an analytical technique capable of identifying a crystalline substance contained in a material or evaluating a crystal structure. The X-ray diffraction analysis method that uses a point detector, which cannot identify a position of an X-ray incident on a detection surface, needs an appropriate slit to measure a diffracted X-ray from a sample and acquire an X-ray diffraction profile representing an X-ray diffraction intensity corresponding to a diffraction angle.

In recent years, unlike the analysis method that uses the point detector, an analysis method in which a two-dimensional detection circuit capable of identifying a position of an X-ray incident on a detection surface is used is being used to acquire an X-ray diffraction profile. In an X-ray diffraction analysis apparatus equipped with such a two-dimensional detection circuit, since the two-dimensional detection circuit is usually used for the purpose of improving the quality of data and speeding up the measurement, it is common that a sample is rotated or rocked to average sample orientations to obtain a diffracted X-ray image. In this case, the obtained diffracted X-ray image has a ring shape, so-called Debye ring, in which all diffraction spots are connected.

There has also been proposed an X-ray diffraction analysis method which aims at the rapid identification and evaluation of a crystal phase (see, e.g., Japanese Laid-Open Patent Publication No. 2013-068555). In this method, while performing the X-ray diffraction measurement, a peak position and an integrated intensity of a diffracted X-rays are obtained, the number of X-ray diffraction peaks is counted, and an analysis processing of identification and quantification of a crystal phase is started when the counted number of peaks reaches a predetermined value. Therefore, it is possible to analyze a material more quickly than before. In this method, when a crystal phase contained in a material is known to some extent and is expected that the range thereof is limited before the measurements, it is possible to analyze the material promptly because analysis is performed on a partially measured X-ray diffraction profile while performing the measurement.

Related Techniques are disclosed in, for example, Japanese Laid-Open Patent Publication No. 2013-068555.

SUMMARY

According to an aspect of the embodiments, an X-ray diffraction analysis method includes, placing a sample on a sample stage and acquiring a two-dimensional X-ray diffraction image from the sample using a two-dimensional detection circuit by irradiating the sample with an X-ray in a state where an X-ray irradiation angle is fixed, specifying a collection of diffraction spots having a predetermined range of diffraction angles from the X-ray diffraction image as a diffraction spot group, counting the number of diffraction spots having predetermined intensity or more in the diffraction spot group, grouping the diffraction spot group based on the number of diffraction spots, and identifying a crystal phase contained in the sample based on a diffraction angle of the grouped diffraction spot group.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
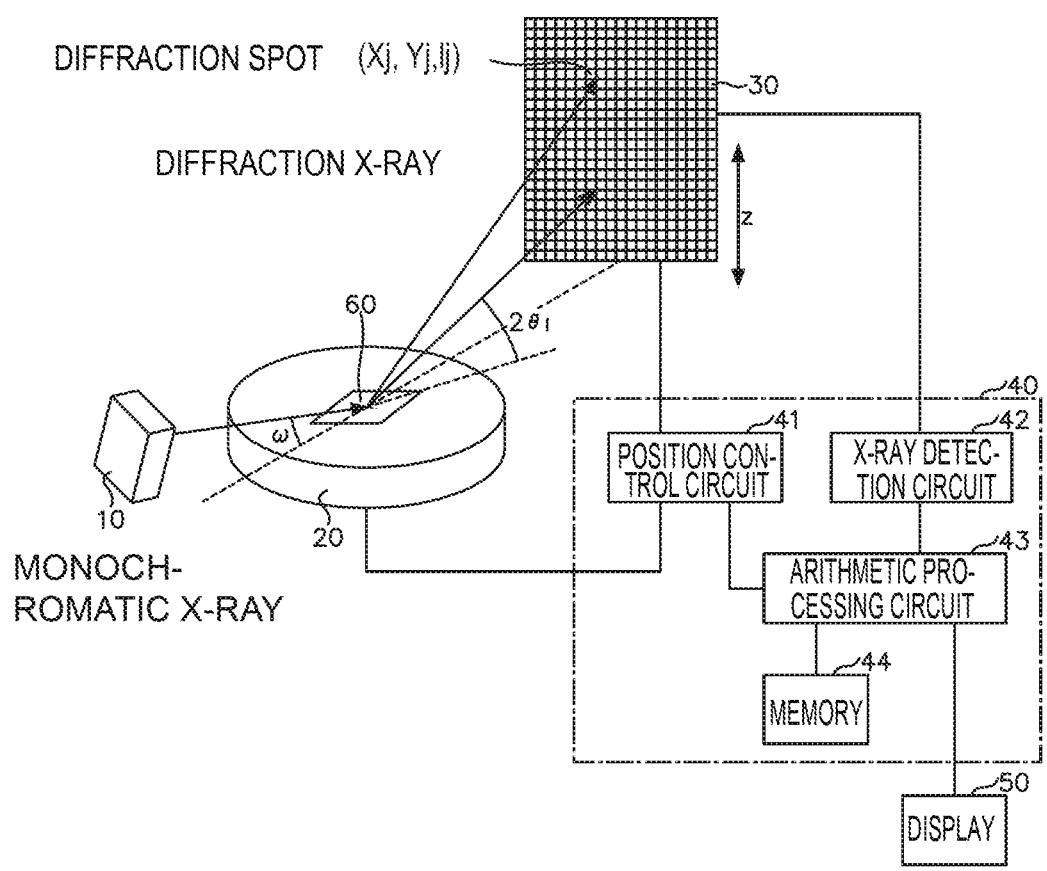
FIG. 1 is a structural view of an X-ray diffraction analysis apparatus according to an embodiment.

In the current development of material, not only the main elements and components constituting a material but also various trace elements are added in order to impart a desired function to the material. For this reason, in such a material, there is a case where a plurality of crystal phases with known and unknown crystal structures, including unintended crystal phases, are precipitated. Therefore, in considering the manufacturing conditions of the material, it is required to, for example, promptly identify the crystal phase of the substance contained in the material and estimate the crystal structure.

When a complex material containing such a plurality of crystal phases is analyzed by an X-ray diffraction analysis method, a number of X-ray diffraction peaks are detected from the plurality of crystal phases. In an X-ray diffraction profile including such a number of X-ray diffraction peaks, it is difficult to easily distinguish the X-ray diffraction peaks between different crystal phases, which takes a long time in a peak matching for identifying the crystal phases.

In addition, when a substance whose crystal structure is unknown is included in a material to be analyzed, there is a case where it is not possible to extract a phase-specific diffraction peaks from the observed X-ray diffraction information, to perform the unknown crystal structure analysis (ab initio powder X-ray diffraction analysis). In this case, it is often impossible to evaluate the crystal structure.

This also applies to a case of using the two-dimensional detection circuit described above. That is, even when the two-dimensional detection circuit is used to obtain an X-ray diffraction profile from a diffracted X-ray image, X-ray diffraction peaks X-ray between different crystal phases may not be distinguished from each other. That is, the X-ray diffraction profile obtained using the two-dimensional detection circuit is the same as an X-ray diffraction profile obtained by a point detector. Therefore, analysis is inherently difficult in a case where a crystal phase not intended by a measurer is contained in a material or in a case where a plurality of crystal phases is contained in the material.

Incidentally, as a method for analyzing a complicated material containing a plurality of crystal phases, composition analysis using a combination of X-ray diffraction and an electron microscope may be adopted. In this case, it is possible to distinguish composition differences for different crystal phases by using the composition analysis using the electron microscope. Therefore, it is possible to estimate and analyze the number of crystal phases contained in the material in advance. However, when an X-ray diffraction profile is obtained by the above method, even when the number of crystal phases is known, since it is necessary to classify the peaks of the measured X-ray diffraction, it takes a time for analysis.

As described above, there is a need for an X-ray diffraction analysis method capable of, for example, promptly identifying the crystal phase of a substance contained in a complicated material formed with a plurality of crystal phases.

Hereinafter, an embodiment of the present disclosure will now be described. In addition, for example, the same members will be denoted by the same reference numerals, and descriptions thereof will be omitted.

(X-Ray Diffraction Analysis Apparatus)

An X-ray diffraction analysis apparatus according to an embodiment includes, for example, an X-ray source 10, a sample stage 20, a two-dimensional detection circuit 30, an arithmetic control circuit 40, and a display 50. An X-ray emitted from the X-ray source 10 is a monochromatic X-ray. A sample 60 of a material to be analyzed is placed on the sample stage 20. The two-dimensional detection circuit 30 is a two-dimensional type position sensitive X-ray detection circuit capable of detecting the incident position $(x_j, y_j)$ and the intensity $I_j$ of the X-ray, and can be moved in the z direction. In the embodiment, the sample 60 to be analyzed is a polycrystalline material having a plurality of crystal phases.

The arithmetic control circuit 40 includes, for example, a position control circuit 41, an X-ray detection circuit 42, an arithmetic processing circuit 43, and a memory 44, and is connected with a display 50 capable of displaying, for example, a two-dimensional image. The position control circuit 41 is connected to the sample stage 20 and the two-dimensional detection circuit 30. The X-ray detection circuit 42 is connected to the two-dimensional detection circuit 30, and detects and measures the incident position $(x_j, y_j)$ and the intensity $I_j$ of the X-ray detected by the two-dimensional detection circuit 30. The display 50 may display various kinds of information including, for example, spot information of the X-ray detected by the two-dimensional detection circuit 30.

The X-ray is emitted from the X-ray source 10 at an irradiation angle ω to the surface of the sample 60. As a result, a diffracted X-ray is generated from each of crystallites in the sample 60 and is incident on the two-dimensional detection circuit 30. In a case where the number of X-ray diffraction peaks obtained by one measurement is small or in a case where the X-ray diffraction peaks are acquired at a wide diffraction angle, the two-dimensional detection circuit 30 may be moved in the z direction for measurement to obtain a plurality of X-ray diffraction images.

(Overview of X-Ray Diffraction Analysis Method)

In an X-ray diffraction analysis method according to the embodiment, the sample 60 is irradiated with the X-ray in a state where the irradiation angle ω is fixed without rotating the sample 60. In this case, the pattern of diffracted X-ray obtained from one crystallite is not a ring-shaped diffraction pattern but a spot (point)-like diffraction pattern. In the embodiment, the spot (point)-like diffraction pattern thus obtained is used.

Figure 2:
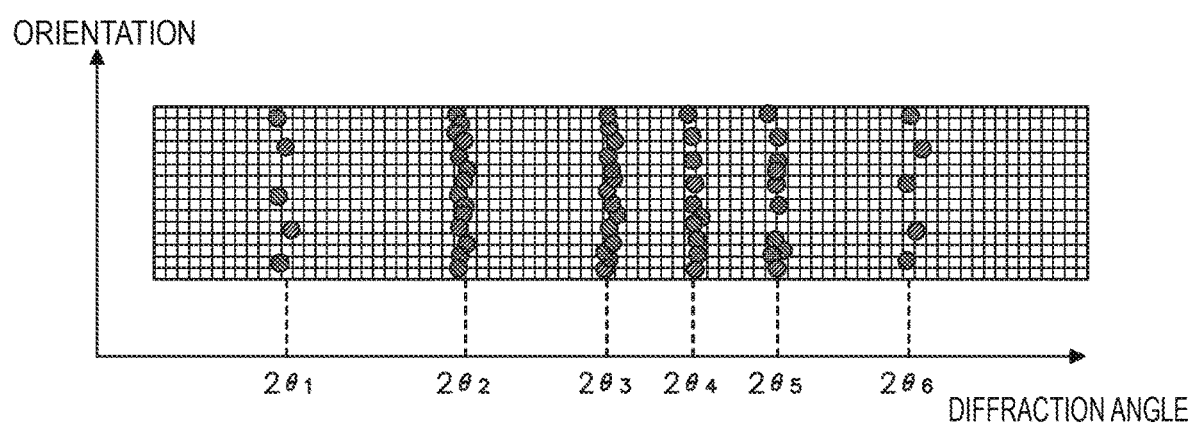
FIG. 2 illustrates an X-ray diffraction image obtained by the X-ray diffraction analysis apparatus according to the embodiment.

FIG. 2 illustrates an X-ray diffraction image from the sample 60 obtained by the two-dimensional detection circuit 30 when the sample 60 is irradiated with the X-ray in a state where the irradiation angle ω is fixed. The sample 60 to be analyzed contains many crystallites of a plurality of crystal phases and these crystallites exist in various orientations (crystal orientations). The vertical axis in FIG. 2 represents the x direction of the two-dimensional detection circuit 30 and corresponds to a difference in crystal orientation of the crystallites contained in the sample 60. The horizontal axis in FIG. 2 represents the y direction of the two-dimensional detection circuit 30, which is the diffraction angular direction in which a diffraction angle increases from left to right.

Diffraction spots near the same diffraction angle illustrated in FIG. 2 are diffraction spots of crystal phases having the same crystal structure, which are obtained from crystallites oriented in different crystal orientations each other. A group of diffraction spots having such diffraction angles close to each other may be referred to as a diffraction spot group in some cases. The number of spots in such a group of diffraction spots depends on the number of crystallites of crystal phases causing the diffraction spots contained in the sample 60. More specifically, when the number of crystallites of a specific crystal phase contained in the sample 60 is small, the number of spots becomes small. When the number of crystallites of the specific crystal phase is large, the number of spots becomes large.

In the meantime, although there is one diffraction spot occurring at a certain diffraction angle from one crystallite, there is a case where another diffraction spot may occur even at another diffraction angle different from the certain diffraction angle although there is a difference in intensity between both. In the embodiment, it is assumed that, in the same crystal phase, the number of diffraction spots occurring at a certain diffraction angle is substantially equal to the number of diffraction spots occurring at another diffraction angle different from the certain diffraction angle.

For the X-ray diffraction image illustrated in FIG. 2, by performing intensity integration of the diffraction spots in the crystal orientation, it is possible to obtain an X-ray diffraction profile of the relationship between diffraction angle and intensity as conventional. It is preferable that the number of spots is measured in consideration of the spread of a spot distribution with respect to a diffraction angle. The following equation (1) expresses the general X-ray diffraction conditions. In the equation (1), d is a spacing between diffraction spots, θ is a diffraction angle, and λ is an X-ray wavelength.

$$2d \sin \theta = \lambda \qquad (1)$$

According to the above equation (1), the relationship between d and θ is not linear but, as d decreases, the change amount Δθ of angle θ with respect to the change amount Δd of the same d increases. That is, as θ approaches 90°, the distribution of spots widens. In addition, as the diffraction angle θ increases, the length of an arc with respect to the width Δφ of the same crystal orientation angle increases, so that the distribution of spots widens. Therefore, in the embodiment, as will be described later, it is preferable to measure the number of spots in a range of $\Delta 2\theta_i(\Delta d_i) \cdot \Delta \phi$ in consideration of the spread of spots at a diffraction angle in the obtained X-ray diffraction image. The symbol $\Delta 2\theta_i(\Delta d_i)$ represents the angular width of diffraction angle such that $\Delta d_i$ becomes equal at a certain diffraction angle.

With the above method, it becomes possible to properly measure the number of spots from the X-ray diffraction image as illustrated in FIG. 2. The embodiment uses the fact that there is a high possibility that a diffraction spot group with different spot numbers is diffraction spots from different crystal phases each other while a diffraction spot group with substantially the same spot numbers is diffraction spots from the same crystal phase. This makes it possible to know how many types of crystal phases are contained in the sample to be analyzed, and further, to classify the peaks of X-ray diffraction for different crystal phases.

(X-ray Diffraction Analysis Method)

Figure 3:
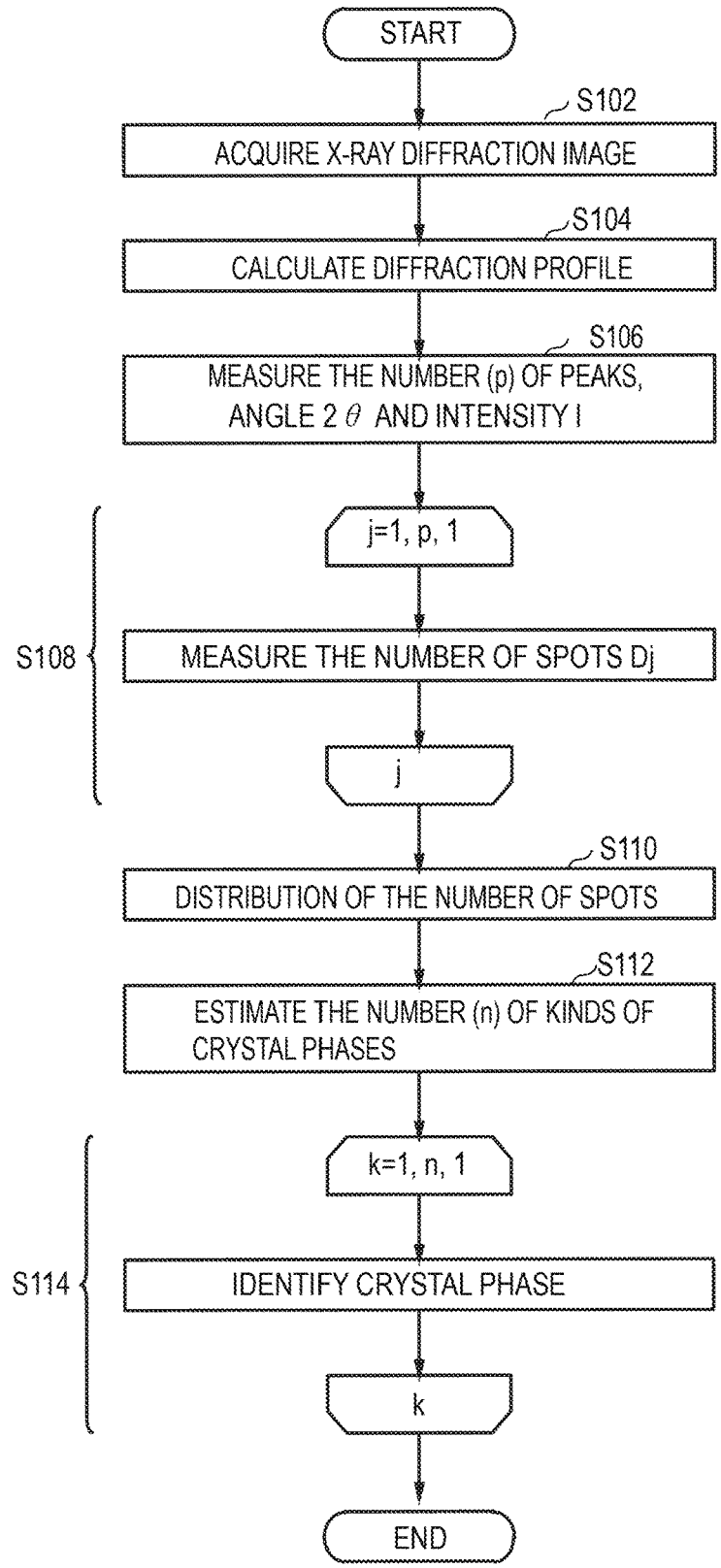
FIG. 3 is a flowchart of an X-ray diffraction analysis method according to the embodiment.

Next, an X-ray diffraction analysis method according to the embodiment will be described with reference to FIG. 3.

First, in step 102 (S102), an X-ray diffraction image is acquired. Specifically, the sample 60 to be analyzed is placed on the sample stage 20 and is irradiated with an X-ray without rotating the sample 60, that is, keeping the sample 60 at a fixed irradiation angle ω of the X-ray, to acquire an X-ray diffraction image generated in the sample 60 by the two-dimensional detection circuit 30. In this way, the X-ray diffraction image as illustrated in FIG. 2 is acquired. The X-ray diffraction image illustrated in FIG. 2 has a plurality of diffraction spots which forms a diffraction spot group for each predetermined diffraction angle. Specifically, diffraction spot groups are generated at the angles of $2\theta_1$, $2\theta_2$, $2\theta_3$, $2\theta_4$, $2\theta_5$, and $2\theta_6$.

Figure 4:
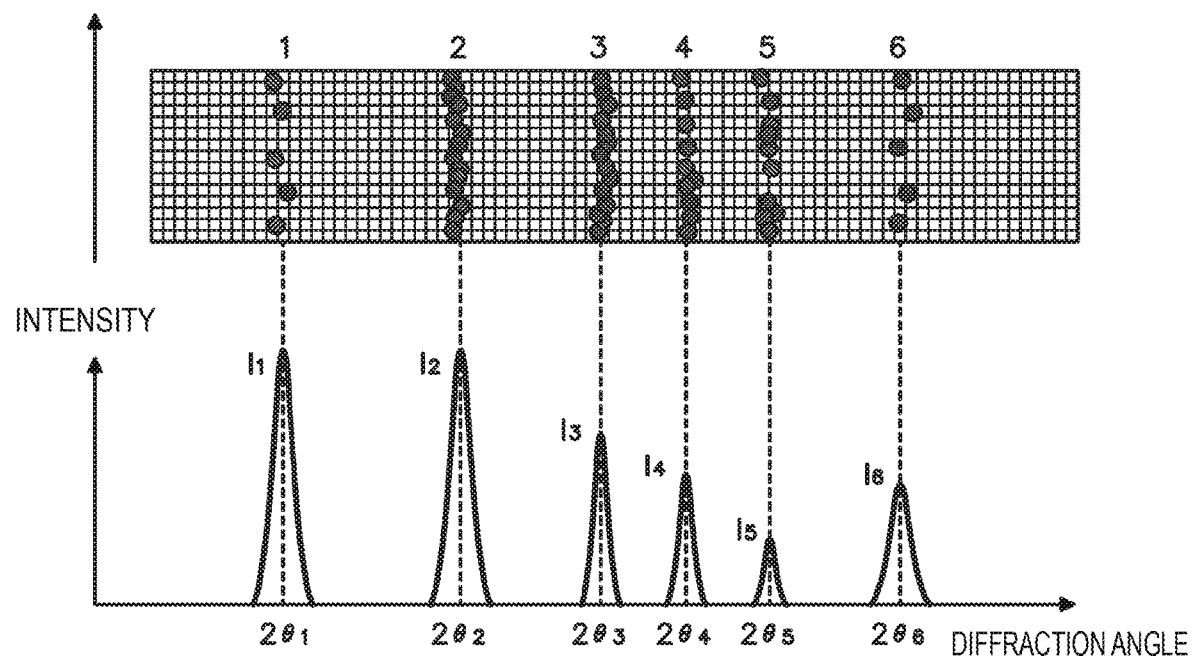
FIG. 4 is an explanatory view of an X-ray diffraction profile according to the embodiment.

Next, in step 104 (S104), an X-ray diffraction profile is calculated from the X-ray diffraction image acquired in step 102. Specifically, in the X-ray diffraction image illustrated in FIG. 2, by performing integration in the crystal orientation direction, an X-ray diffraction profile as illustrated in FIG. 4 is calculated.

Next, in step 106 (S106), the number (p) of peaks of diffraction intensity and the diffraction angle and intensity of each peak are measured from the X-ray diffraction profile calculated in step 104. Specifically, in the case illustrated in FIG. 4, the diffraction intensity is the diffraction intensity $I_1$ at the angle $2\theta_1$, the diffraction intensity $I_2$ at the angle $2\theta_2$, the diffraction intensity $I_3$ at the angle $2\theta_3$, the diffraction intensity $I_4$ at the angle $2\theta_4$, the diffraction intensity $I_5$ at the angle $2\theta_5$, and the diffraction intensity $I_6$ at the angle $2\theta_6$. From this, it can be seen that the number p of diffraction intensity peaks is 6. The number p of diffraction intensity peaks corresponds to the number of diffraction spot groups described above.

Next, in step 108 (S108), the number of spots $D_j$ is measured for the diffraction intensity peaks from 1 to p. Specifically, as illustrated in FIG. 4, since the number p of diffraction intensity peaks is six, the number of diffraction spots $D_j$ is counted for the diffraction intensity peak at j ranging from 1 to 6. That is, the counting of the number of diffraction spots $D_j$ at each diffraction intensity peak is repeated with j from 1 to 6. In the case illustrated in FIG. 4, the number of diffraction spots $D_1$ is 5 for the angle $2\theta_1$ with j=1. The number of diffraction spots $D_2$ is 14 for the angle $2\theta_2$ with j=2. The number of diffraction spots $D_3$ is 14 for the angle $2\theta_3$ with j=3. The number of diffraction spots $D_4$ is 10 for the angle $2\theta_4$ with j=4. The number of diffraction spots $D_5$ is 10 for the angle $2\theta_5$ with j=5. The number of diffraction spots $D_6$ is 5 for the angle $2\theta_6$ with j=6.

Figure 5A:
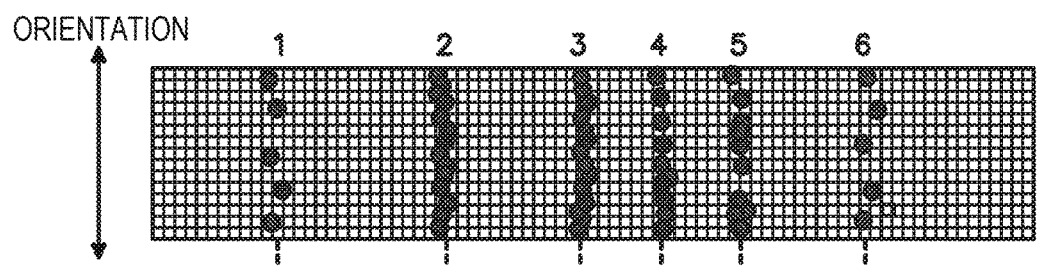
FIGS. 5A to 5C are explanatory views (1) of an X-ray diffraction analysis method according to the embodiment.
Figure 5B:
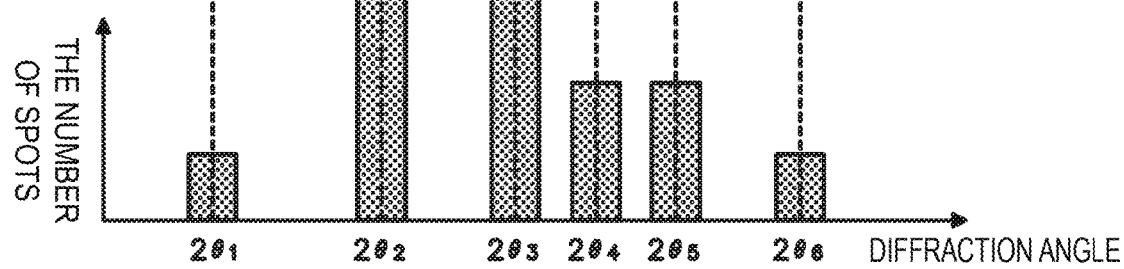

Next, in step 110 (S110), a distribution of the number of diffraction spots as illustrated in FIG. 5B is obtained from the result of step 108. In the distribution of the number of diffraction spots, the horizontal axis represents a diffraction angle and the vertical axis represents the number of spots. In addition, FIG. 5A illustrates the same X-ray diffraction image as those illustrated in FIGS. 1 and 4.

Figure 5C:
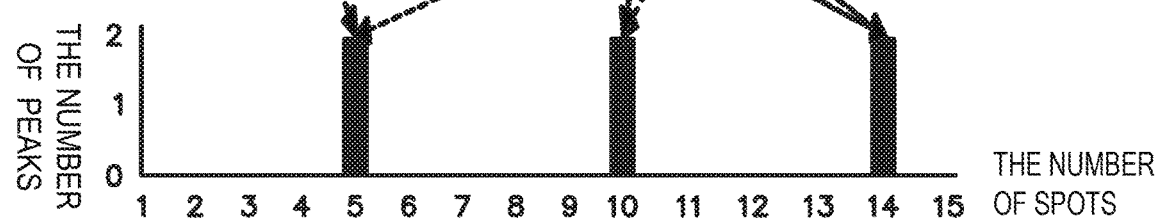

Next, in step 112 (S112), the number (n) of crystal phases contained in the sample is estimated. Specifically, a relationship between the number of diffraction spots and the number of peaks thereof is obtained from the result illustrated in FIG. 5B and the number (n) of crystal phases contained in the sample is estimated from the obtained relationship between the number of diffraction spots and the number of peaks thereof. FIG. 5C illustrates the relationship between the number of diffraction spots and the number of peaks, which is obtained based on the results illustrated in FIG. 5B. In the result illustrated in FIG. 5B, the number of diffraction spots $D_j$ is 5 when j is 1 and 6, the number of diffraction spots $D_j$ is 14 when j is 2 and 3, and the number of diffraction spots $D_j$ is 10 when j is 4 and 5, which are plotted in graph in FIG. 5C.

Figure 6:
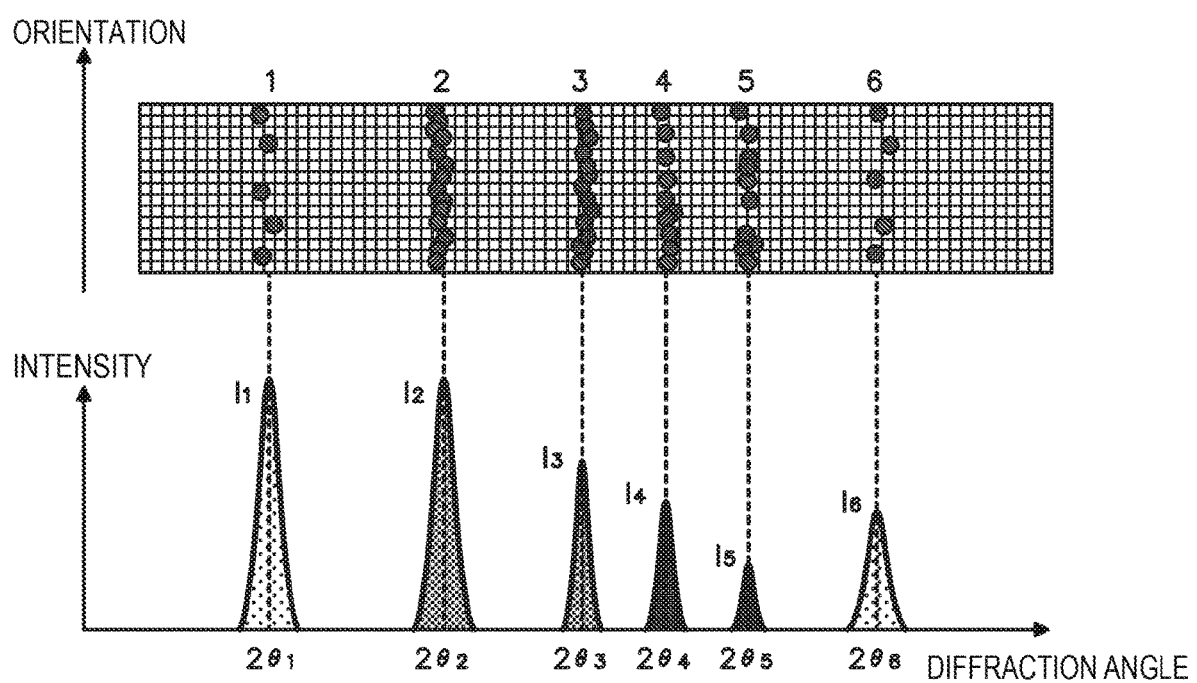
FIG. 6 is an explanatory view (2) of an X-ray diffraction analysis method according to the embodiment.

As illustrated in FIG. 5C, the number of peaks is 2 when the number of diffraction spots is 5, the number of peaks is 2 when the number of diffraction spots is 10, and the number of peaks is 2 when the number of diffraction spots is 14. When the number of diffraction spots is the same, it is inferred that it is the diffraction in the same crystallite. Therefore, it is estimated from the result illustrated in FIG. 5C that the number (n) of kinds of crystal phases contained in the sample is 3. As a result, as illustrated in FIG. 6, it can be seen that diffraction spots with diffraction angles of $2\theta_1$ and $2\theta_6$ are from the same crystal phase, diffraction spots with diffraction angles $2\theta_2$ and $2\theta_3$ are from the same crystal phase, and diffraction spots with diffraction angles $2\theta_4$ and $2\theta_5$ are from the same crystal phase.

Next, in step 114 (S114), crystal phases contained in the sample are identified. That is, since n is 3, three kinds of crystal phases are identified based on a combination of respective X-ray diffraction peaks. Specifically, at first, with k=1, a crystal phase is identified when its diffraction angle is the angle $2\theta_1$ and the angle $2\theta_6$. In this case, since it is sufficient to select a crystal phase whose diffraction angle is the angle $2\theta_1$ and the angle $2\theta_6$, it is possible to relatively easily identify the crystal phase. This is repeated until k reaches 3. In other words, similarly, with k=2, a crystal phase is identified when its diffraction angle is the angle $2\theta_2$ and the angle $2\theta_3$ and, with k=3, a crystal phase is identified when its diffraction angle is the angle $2\theta_4$ and the angle $2\theta_5$.

Thus, the X-ray diffraction analysis method according to the embodiment is completed. In the X-ray diffraction analysis method according to the embodiment, as described above, even when a sample includes a plurality of crystal phases, without taking a long time to select a pattern of combination of X-ray diffraction peaks, it is possible to easily identify a plurality of crystal phases in a short time. Further, even when the sample 60 contains a substance whose crystal structure is unknown, it is possible to easily estimate and determine the crystal structure.

In a case where a range of a diffraction angle acquired by the two-dimensional detection circuit 30 is narrow or in a case where the width $\Delta\phi$ of the crystal orientation angle is narrow, as will be described later, the above-described approximated method may be used for the sake of convenience without considering the predetermined width $\Delta\phi$ of the crystal orientation angle and the predetermined angular width $\Delta 2\theta_i$. In this case, those having substantially the same number of diffraction spots may be determined as the same crystal phase. Generally, in a case where three or more kinds of crystal phases are contained in a sample, since time and labor are particularly required for estimation and determination of a crystal structure, the X-ray diffraction analysis method according to the embodiment is particularly effective in such estimation and determination.

(Number of Diffraction Spots)

The above description has been made with the number $D_j$ of diffraction spots at respective diffraction peaks in step 108 for the sake of convenience. Actually, however, as expressed by in the above equation (1), the spot distribution spreads as the diffraction angle increases. Therefore, in order to perform an accurate analysis, a determination may be made based on the number of diffraction spots included in the predetermined crystal orientation angle width $\Delta\phi$ and the predetermined angular width $\Delta 2\theta_i$. In the embodiment, the number of diffraction spots at the predetermined crystal orientation angle width $\Delta\phi$ and the predetermined angular width $\Delta 2\theta_i$ may be sometimes referred to as spot density.

Figure 7:
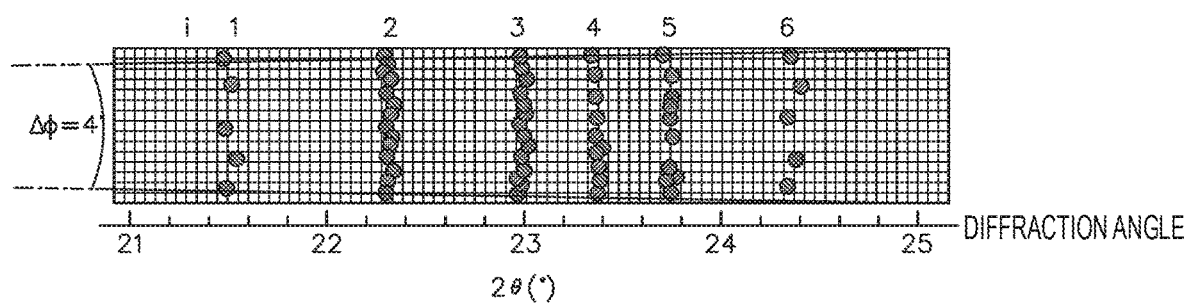
FIG. 7 is an explanatory view (1) in a case where the width $\Delta\phi$ of a crystal orientation angle and the angular width $\Delta 2\theta_i$ of a diffraction angle are considered.

FIG. 7 illustrates an X-ray diffraction image obtained in the embodiment illustrated in, for example, FIG. 2. As indicated by a dash-dotted line, as the diffraction angle increases, the crystal orientation angle width $\Delta\phi$ is constant but the width of a detection area widens. This X-ray diffraction image is obtained by measuring a range of $2\theta$, which corresponds to a diffraction angle from 21° to 25°, by the two-dimensional detection circuit 30, illustrating a case where the crystal orientation angle width $\Delta\phi$ is 4°. Table 1 represents diffraction angles $2\theta_i$, surface spacings $d_i$ and angular widths $\Delta 2\theta_i$ of the diffraction angles for diffraction spot groups of i from 0 to 6 illustrated in FIG. 7. In addition, the angular widths $\Delta 2\theta_i$ of the diffraction angles are angular widths such that $\Delta d_i = \pm 0.5°$ for the surface distance $d_i$ of each peak.

TABLE 1

| Peak number (n) | $2\theta_i$ (°) | $d_i$ (Å) | $\Delta 2\theta_i$ (°) |
| --- | --- | --- | --- |
| 1 | 21.432 | 1.6669 | 0.217 |
| 2 | 22.254 | 1.6061 | 0.225 |
| 3 | 22.986 | 1.5556 | 0.233 |
| 4 | 23.385 | 1.5294 | 0.237 |
| 5 | 23.766 | 1.5052 | 0.241 |
| 6 | 24.372 | 1.4684 | 0.247 |

Figure 8A:
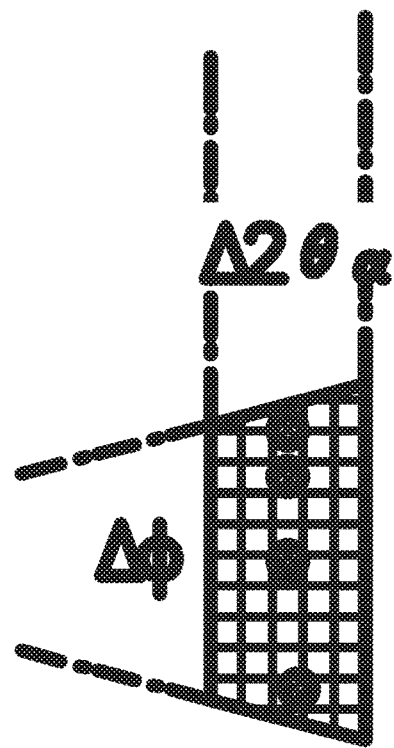
FIGS. 8A and 8B are explanatory views (2) in a case where the width $\Delta\phi$ of a crystal orientation angle and the angular width $\Delta 2\theta_i$ of a diffraction angle are considered.
Figure 8B:
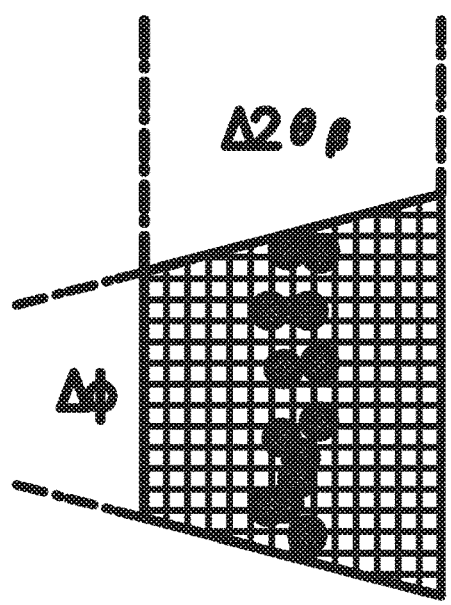

This will be described in more detail with reference to FIGS. 8A and 8B. FIG. 8A illustrates an X-ray diffraction image at a predetermined crystal orientation angle width $\Delta\phi$ and a predetermined angular width $\Delta 2\theta_\alpha$ on a relatively smaller diffraction angle side, and FIG. 8B illustrates an X-ray diffraction image at a predetermined crystal orientation angle width $\Delta\phi$ and a predetermined angular width $\Delta 2\theta_\beta$ on a relatively larger diffraction angle side. In the embodiment, a spot density may be obtained in consideration of the spread of the spot distribution due to a diffraction angle. For example, for an a-th spot group, the number of diffraction spots having predetermined intensity in a region of the detection surface of the two-dimensional detection circuit 30, which is defined by a diffraction angle width $\Delta 2\theta_\alpha(\Delta d_\alpha)$ such that a deviation width $\Delta d_\alpha$ of the surface spacing becomes constant and the crystal orientation angle width $\Delta\phi$, is counted. Further, for an $\beta$-th spot group, the number of diffraction spots having predetermined intensity in a region of the detection surface of the two-dimensional detection circuit 30, which is defined by a diffraction angle width $\Delta 2\theta_\beta(\Delta d_\beta)$ such that a deviation width $\Delta d_\beta$ of the surface spacing becomes constant and the crystal orientation angle width $\Delta\phi$, is counted. Therefore, as illustrated in FIGS. 8A and 8B, the area of the detection surface of the two-dimensional detection circuit 30 that counts the number of diffraction spots on the relatively larger diffraction angle side becomes wider than the area of the detection surface of the two-dimensional detection circuit 30 that counts the number of diffraction spots on the relatively smaller diffraction angle side. In addition, a spot having predetermined intensity may be, for example, a spot having half or more of average intensity obtained by calculation of an X-ray diffraction profile.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An X-ray diffraction analysis method comprising:
    placing a sample on a sample stage and acquiring a two-dimensional X-ray diffraction image from the sample using a two-dimensional detection circuit by irradiating the sample with an X-ray in a state where an X-ray irradiation angle is fixed;
    specifying a plurality of collections of diffraction spots from the X-ray diffraction image as diffraction spot groups, each of the diffraction spot groups including the diffraction spots having respective ranges of diffraction angles;
    counting the number of diffraction spots having predetermined intensity or more in each of the diffraction spot groups;
    grouping the diffraction spot groups in such a manner that one or more diffraction spot groups having the same number of diffraction spots belong to the same group to make one or more groups; and
    identifying one or more crystal phases contained in the sample based on one or more diffraction angles of the one or more diffraction spot groups which are included in the same group.

2. The X-ray diffraction analysis method according to claim 1, further comprising:
    calculating an X-ray diffraction profile of a relationship between diffraction angle and intensity by integrating the intensity of the diffraction spot in a crystal orientation; and
    identifying the one or more crystal phases based on the X-ray diffraction profile.

3. The X-ray diffraction analysis method according to claim 1, wherein the act of counting the number of diffraction spots includes counting the number of diffraction spots in each of the diffraction spot groups in a region at a predetermined crystal orientation width and a predetermined diffraction angle width.

4. The X-ray diffraction analysis method according to claim 1, wherein the sample is a polycrystalline material containing a plurality of crystal phases.

5. The X-ray diffraction analysis method according to claim 1, further comprising:
   estimating a number of the one or more groups as a number of the one or more crystal phases contained in the sample; and
   repeating the identify the number of the one or more crystal phases times.

6. An X-ray diffraction analysis apparatus comprising:
   an X-ray source configured to irradiate a sample with an X-ray in a state where an X-ray irradiation angle is fixed;
   a sample stage configured to place the sample thereon; a two-dimensional detection circuit configured to acquire a two-dimensional X-ray diffraction image from the sample; and
   an arithmetic control circuit configured to:
      acquire the two-dimensional X-ray diffraction image from the sample by a two-dimensional detection circuit;
      specify a plurality of collections of diffraction spots from the X-ray diffraction image as diffraction spot groups, each of the diffraction spot groups including the diffraction spots having respective ranges of diffraction angles;
      count the number of diffraction spots having predetermined intensity or more in each of the diffraction spot groups;
      group the diffraction spot groups in such a manner that one or more diffraction spot groups having the same number of diffraction spots belong to the same group to make one or more groups; and
      identify one or more crystal phases contained in the sample based on one or more diffraction angles of the one or more diffraction spot groups which are included in the same group.

7. The X-ray diffraction analysis apparatus according to claim 6, wherein the two-dimensional detection circuit is configured to calculate an X-ray diffraction profile of a relationship between diffraction angle and intensity by integrating the intensity of the diffraction spot in a crystal orientation, and identify the one or more crystal phases based on the X-ray diffraction profile.

8. The X-ray diffraction analysis apparatus according to claim 6, wherein the two-dimensional detection circuit is configured to:
   estimate a number of the one or more groups as a number of the one or more crystal phases contained in the sample; and
   repeat the identify the number of the one or more crystal phases times.

* * * * *